Sept. 6, 1927.

A. B. CLARK 1,641,576

SPEED CHANGE GEAR

Filed Oct. 30, 1925   3 Sheets-Sheet 1

Inventor,

Albert B. Clark;

A B Upham,

Attorney.

Sept. 6, 1927.　　　　　A. B. CLARK　　　　　1,641,576
SPEED CHANGE GEAR
Filed Oct. 30, 1925　　　3 Sheets-Sheet 2
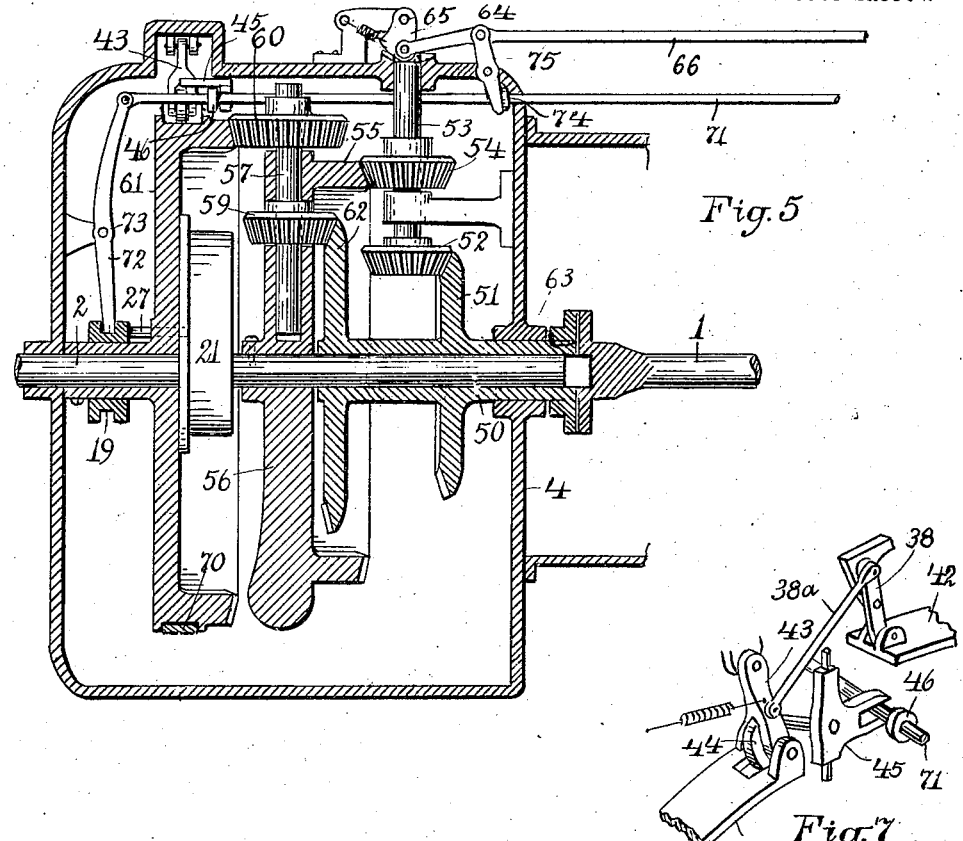
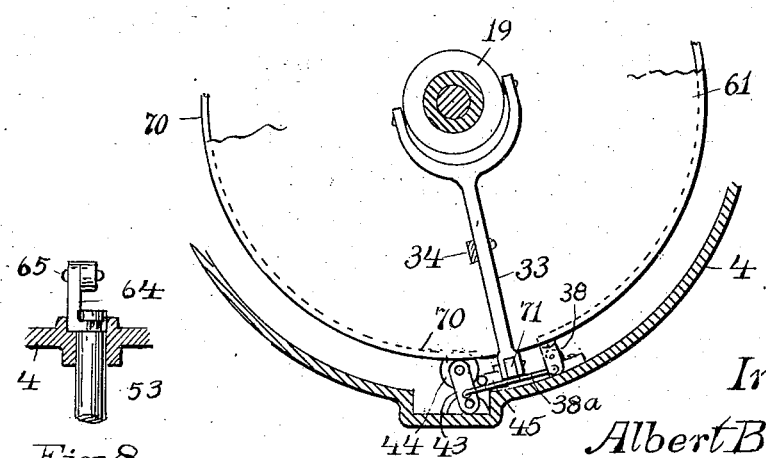
Inventor,
Albert B. Clark;

Sept. 6, 1927.  A. B. CLARK  1,641,576
SPEED CHANGE GEAR
Filed Oct. 30, 1925    3 Sheets-Sheet 3

Inventor,
Albert B. Clark;
By A. B. Upham,
Attorney.

Patented Sept. 6, 1927.

1,641,576

UNITED STATES PATENT OFFICE.

ALBERT BURDETT CLARK, OF BOSTON, MASSACHUSETTS.

SPEED-CHANGE GEAR.

Application filed October 30, 1925. Serial No. 65,751.

This invention relates to transmission gearing for automobiles and the like, and especially to that class of such gearing wherein two or more speeds may be secured in a forward direction, and a slow speed in a reverse direction.

The main object of this invention is the provision of means tensioned with the drive and driven members and forming thereby an operating connection on intermediate and high speeds through the means of a resistance variable at will, and forming an operating connection on low speed drive by disconnecting the resistance and holding the tensioning means from opposite motion against the tension.

Another object is the provision of a construction wherein no additional means or movements are required to obtain either high or low speeds or additional intermediate speeds, the selection depending only on the quickness with which the speed control lever is moved.

Another object is the provision of means whereby the forward speed changes are effected without decreasing the momentum of the car or engine or racing the latter.

Still another object is the provision of a construction wherein the gears are always in mesh during forward speed changes; this, with the method of control employed, eliminating the danger of the gear backslipping between gear changes, and also eliminating the danger of stripping and clashing the gears.

Also, the provision of means whereby the resistance elements controlling the forward intermediate speeds operatively turn together within the revolving gear set, thus saving power wasted through friction caused when the resistance is engaged with stationary parts.

And, the provision of a construction wherein constantly turning countershafts are eliminated.

Reasons for this construction being especially adapted for automobiles and the like using internal combustion engines, are that it is not necessary to disengage the driving power from the gearing before the speed changes are effected; the incorporation of a neutral position, and the flexibility, convenience, safety and compactness of the speed change gear herein set forth.

To these ends and to such others as the invention may appertain, the same consists in the novel construction, peculiar arrangement, the combination and adaptation of the parts and of the whole, all as fully described herein, and then specifically defined in the appended claims.

Figure 1:
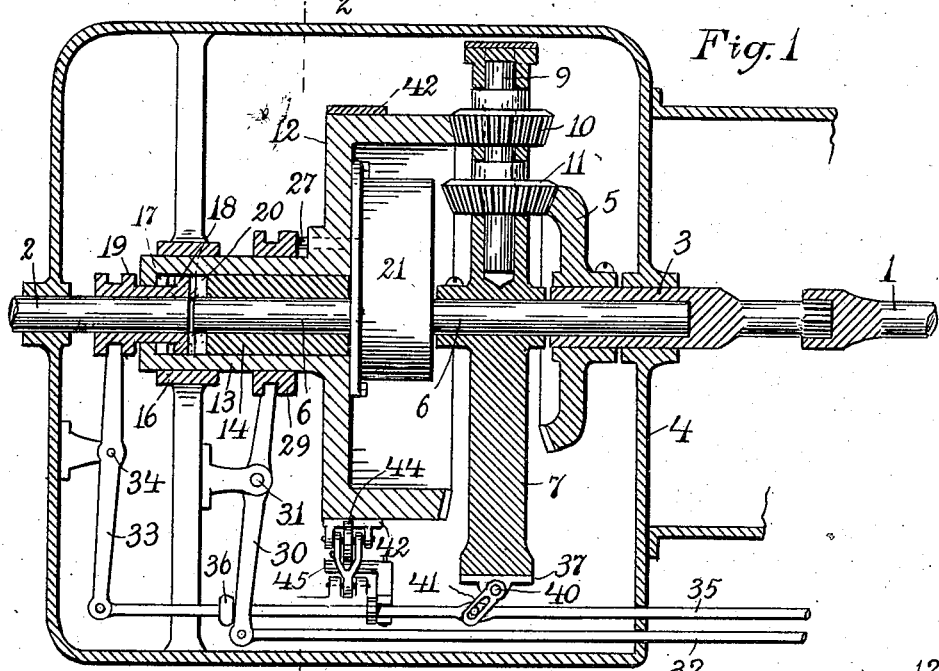
Figure 3:
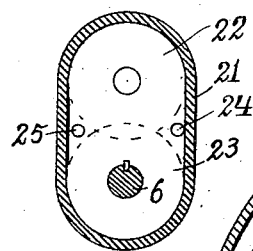
Figure 2:
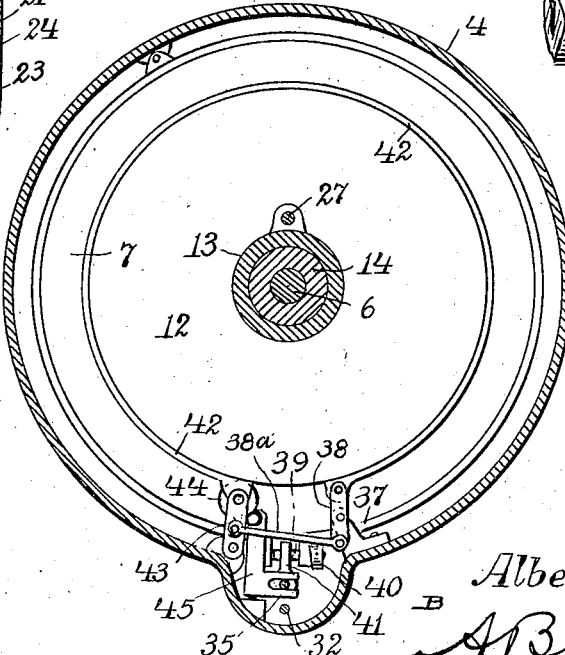
Figure 4:
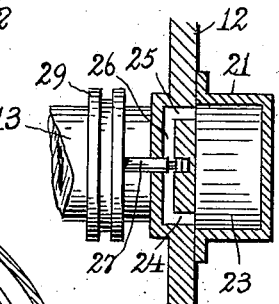
Figures 9, 10:
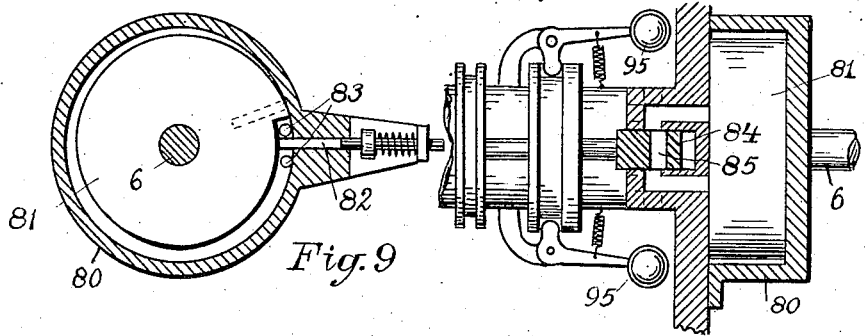
Figure 11:
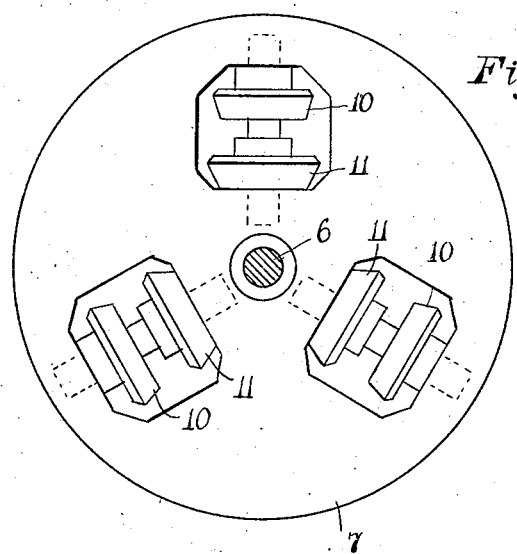
Figure 12:
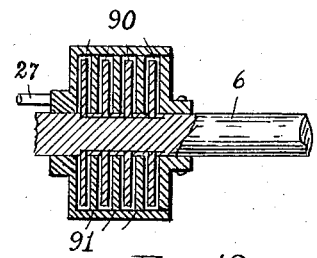
Figure 13:
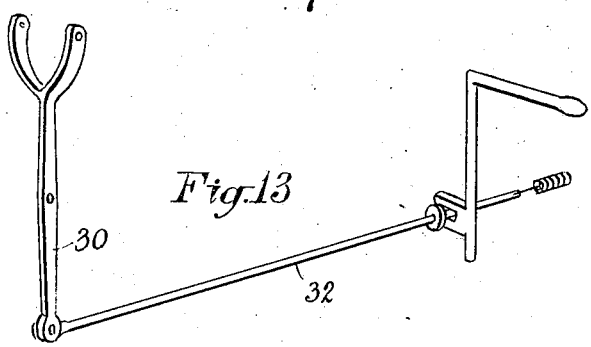

In the drawings forming part of this specification, Fig. 1 is a longitudinal section of a speed change gear embodying the preferred form of the invention. Fig. 2 is a sectional view on the line 2—2 in Fig. 1. Figs. 3 and 4 are detail views of the resistance element. Fig. 5 is a longitudinal section of a modification of the invention. Fig. 6 is a detail view of a part thereof. Fig. 7 is a perspective detail view of the same. Fig. 8 is a sectional detail view of the spindle shifting device. Fig. 9 shows another type of resistance. Fig. 10 is another view thereof. Fig. 11 is a face view of the disk. Fig. 12 shows another form of resistance. Fig. 13 is a perspective view of the speed control lever and connections.

In each of the two constructions, the reference numeral 1 designates the engine shaft; and 2, the propeller shaft designed to be connected with the driving wheels in a well known manner; both shafts being preferably in alinement.

Referring first to Figs. 1 and 2, a sleeve 3 in clutch with the engine shaft 1 and having bearings in the casing 4, carries a bevel gear 5 fast thereon. Turning in the sleeve 3 and reaching substantially to the shaft 2, is a shaft 6 upon which is fixed a disk 7 rotatably carrying one or more spindles 9. The latter have each two bevel gears 10 and 11 fast thereon; the gear 11 meshing with the bevel gear 5, while the other meshes with a large bevel gear 12 which is provided with an elongated hub 13 rotatably mounted on a sleeve 14 fast to the shaft 6. This hub is rotatably supported in bearings 16 and has a flanged end provided with clutch teeth 17; the neighboring end of the sleeve 14 being also provided with clutch teeth 20. A clutch member 19 is slidable upon but turns with the shaft 2, and has projections 18 adapted to be engaged with the clutch teeth 17 when it is slid toward the left; and with the clutch teeth 20 when it is slid toward the right; thereby putting either the hub 13 or the shaft 6 into clutch with the shaft 2.

Attached to the inner face of the large gear 12 is a resistance device comprising a case 21 having two snugly fitting intermeshing gears 22, 23 therein, the latter of which is keyed to the shaft 6. At opposite sides of the gears 22, 23 are ports 24, 25 united by a cross-conduit 26 adjustably controlled by a pin 27 having an annular groove, whereby the passage of oil or other liquid from port to port is limited from nothing to the full amount pumped by the gears. The groove serves to thus control the rotation of the gears without any back-pressure; in other words, it is a balanced valve.

This pin is held by a collar loose upon the hub 13 and reciprocated by a lever 30 pivotally supported at 31 and attached to a rod 32 which is designed to be under the control of the usual speed change lever. By entirely closing the cross-conduit 26, no oil or other liquid in the case 21 can be forced by the revolving gears 22, 23 through the ports, and consequently the shaft 6 and gear 12 will be forced to rotate together; by wholly opening the conduit, there will be no such resistance, and the shaft 6 and gear 12 will have free relative rotation; and, by partially closing the cross-conduit, any desired degree of resistance to the liquid passage can be had, and any desired intermediate speed of the shaft and gear can be obtained; thus transmitting to the driven shaft 2 any rate of forward speed called for.

Although I have illustrated the intermeshing gears 22, 23 as the means for providing the desired variable resistance, and which is more fully set forth in my companion application Serial No. 29,380, filed May 11, 1925, I do not wish to restrict myself thereto, as the liquid resistance device set forth in Figs. 9 and 10, or the friction disks shown in Fig. 12, may be employed.

The gear set is designed to operate to better advantage with a low friction loss in the resistance element such as that of the liquid above described, although a frictional resistance such as that provided by the disks in Fig. 12 may be used advantageously if the high and low speeds are to be utilized more frequently than the intermediate speeds, as there would then be no appreciable wear.

The clutch member 19 is controlled by means of a lever 33 pivotally supported at 34 and attached to a rod 35 whose farther extremity is designed to be connected with and controlled by the usual reverse lever. Upon this rod 35 is a collar 36 adapted to come against the lever 30 when the reversing lever is thrown into reverse, and thereby simultaneously to clutch the shaft 2 with the gear 12, and to withdraw the pin 27 from all interference with the passage of liquid through the cross-conduit 26. At the same time, the rod 35 will cause a friction band 37 to tightly grip the disk 7 and hold it from turning. The means thus controlling the band 37 consists of a slender spindle 39 having one or more side cams 40 engaging lugs at the ends of the band 37, and turned by an arm 41 controlled by the rod 35, whereby, as the rod is moved toward the right, the band is tightened and the disk held.

The gear 12 has a friction band 42 about it, one end of which is loosely connected to the casing by a link 43 obliquely disposed in such a manner that when the gear 12 turns in one direction, the link will tend toward a radial line and thereby bind the band 42 thereon and hold the gear from turning. In an opposite turn of the gear the band is released, since the link is swung more obliquely. The other end of the band is pivoted to an end of a rock arm 38 fulcrumed on a projection from the casing and connected at its other end by a slender rod $38^a$ to the link 43, whereby both ends of the band are simultaneously gripped upon the gear when the latter is turned in one direction, and released upon an opposite turn. To aid this action, the link 43 is provided with a small wheel 44 so arranged that when the gear begins to turn the link 43 can be put more easily into either its clamping position or its release condition.

The band 42 is made to positively release the gear 12 when the band 37 grips the member 7, by means of a pivotally supported angle-member 45 which is caused by a collar 46 on the rod 35 to press the link 43 farther from a radial approximation and thereby to loosen the band on the gear, as in Fig. 7.

The operation of this change speed gear is as follows: With the reverse pedal in its normal position for the forward motion of the car, the rod 35 is in its extreme left-hand position so that the shaft 6 is in clutch with the shaft 2 and the band 37 is loose upon the disk 7. Consequently, as the shaft 1 revolves, the gear 5 will turn the gears 11, 10, and, by the meshing of the gear 10 with the band-held gear 12, it will cause both the shaft 6 and the disk 7 to revolve in the same direction with the engine shaft. Now, by manipulating the speed change lever, the oil resistance can be varied to give any desired rate of progress.

To reverse, the reverse lever is depressed to move the rod 35 toward the right, thereby first putting the clutch into neutral, and then putting the clutch 19 into engagement with the teeth 17 and hence into clutch with the hub 13, and simultaneously causing the band 37 to grip the disk 7 and hold it fast. Then the rotation of the gears 5, 10 and 11 will cause the gear 12 to be revolved backward, at a speed less than that of the engine.

In the modification of my invention shown in Figs. 5 and 6, the engine shaft is coupled with an extension 50 reaching partly through the elongated hub of the twin gears 51, 62, and turning the latter. The propeller shaft 2 is here extended to meet the extension shaft 50. The gear 51 meshes with a bevel gear 52 fast upon a longitudinally movable spindle 53 which also carries a bevel gear 54 which meshes with a toothed flange 55 projecting from a member 56 keyed upon the propeller shaft 2. This member 56 rotatably carries a radially disposed spindle 57 having two bevel gears 59, 60 fast thereon, the latter of which meshes with a large bevel gear 61 loose upon the shaft 2; while the other gear 59 meshes with a bevel gear 62 loose upon the shaft 2 but turning with the gear 51 and the shaft 1, both shafts having bearing support 63.

For putting the gears 52, 54 into mesh with the gears 51, 55, and for withdrawing them therefrom, the spindle 53 is reciprocated by means of a cam 64 pivotally supported at 65 and engaging the end of the spindle 53, as shown in Figs. 5 and 8; so that by pushing upon the rod 66, the spindle is forced down and its gears 52, 54 put into mesh with the gears 51, 55; and a reverse movement of the rod withdraws said gears from their intermeshing.

When the gears are in mesh, the brake band 70 being loose on the large gear 61, the member 56 will be revolved backward, carrying with it the propeller shaft 2 in the same direction; but when the gears 51, 52, 54 and 55 are out of mesh and the band 70 is tightened, both the member 56 and the gear 61, together with the shaft 2 will be turned at a speed dependent upon the resistance in the case 21 and in the same direction with the shaft 1.

For thus controlling the band 70, it is provided with an oblique link 43, wheel 44, and angle-member 45, controlled by a collar 46 on a rod 71, one end of which is attached to a lever 72 pivoted at 73 and engaging the clutch member 19. The other end of this rod 71 has a knob 74 thereon engaged by an intermediately pivoted lever 75 whose other end is attached to the rod 66; whereby when the rod 66 is moved toward the left to reverse the car, the band 70 is permitted to grip and hold the gear 61, while a movement toward the right, will disengage the gears 52, 54 and release the gear 61 from the band 70.

In Figs. 9 and 10 is shown another form of fluid resistance between the shaft 6 and the large gear 12 in my construction set forth in Figs. 1 to 4. Here, instead of intermeshing gears 22, 23, the case 80 is cylindrical and contains a cam-shaped rotating member 81 cooperating with a sliding abutment 82, whereby the resistance element, oil, is forced through the ports 83, in the same manner as above described. Instead of a simple pin 27 shown in Figs. 1 and 4, I here show a plug 84 having a transverse hole 85 through it, by which the communication between the two ports is varied.

As shown in Fig. 11, I prefer to provide the disk 7 with three equally spaced sets of gears 10, 11, in order both to properly balance the same, and to reduce the strain upon the gears.

In the resistance element illustrated in Fig. 12, the disks 90 are keyed to the shaft 6, and the disks 91 are keyed to the interior of the case 92 which is attached to the gear 12, friction between the two sets of disks being increased by pressure through the pin 27.

As shown in Fig. 10, the resistance can be automatically controlled, additionally to the hand-control, by means of the ball governor 95 acting to diminish the resistance as the speed of the car increases, until the maximum is reached.

What I claim as my invention is:

1. A speed change gear comprising an engine shaft, a gear turning with the engine shaft, an intermediate shaft in alinement with said engine shaft fixed on said intermediate shaft, a radially disposed spindle carried by said member, two gears fast on said spindle, one thereof in mesh with the first-named gear, a large gear in mesh with the other of said two gears and rotative on said intermediate shaft, a propeller shaft in alinement with said intermediate shaft, a variable resistance element connected with said large gear and with said intermediate shaft, means for clutching said propeller shaft to either said large gear or said resistance element, means for automatically holding said large gear from turning backward but not forward, and means operative when the propeller shaft is put into clutch with said large gear to hold said intermediate shaft from rotating.

2. In a speed change gear, the combination with an engine shaft, an intermediate shaft and a propeller shaft all in alinement, of a large gear having a resistance connection between itself, said intermediate shaft, and the propeller shaft, a member rotative on said intermediate shaft, a radially disposed spindle carried by said member, two gears fast on said spindle, one thereof meshing with the said large gear, a gear meshing with the other of said two gears and adapted to be rotated by the engine shaft, means for holding said large gear stationary at will, and means for varying the resistance between said large gear and the intermediate shaft and said intermediate shaft.

3. In a speed change gear, the combination with an engine shaft and a propeller shaft, of a section of shafting in alinement with and between said two shafts, a bevel gear rotated by the engine shaft, a disk fast upon the shafting-section, a radially disposed spindle carried by said disk, two bevel gears fast on said spindle, one in mesh with the first-named gear, a large bevel gear in mesh with the other of said two gears, a resistance element between said large gear and said shafting section, means for clutching respectively said gear and said shaft-section with the propeller shaft, means for automatically holding the said large gear from backward motion, means operative at will for locking said disk from rotation and disengaging said holding means, and means controllable by the chauffeur for simultaneously locking said disk and shifting said clutching means to cause the propeller shaft and shafting section to turn together, and means controllable by the chauffeur to vary said resistance element.

4. In a speed change gear, the combination of a drive member, a driven member, and a third member, all rotating on the same axis, the driven member having a plurality of rotatable radially disposed spindles each having two gears fixed thereon, said third member having teeth meshing with one gear of each of said two gears, a gear turning with the drive member and meshing with the other of each of said two gears, a variable resistance between said third member and a driven member to which it is desired to transmit power, and controlled means for holding said third member from rotation in one direction.

5. In a speed change gear, the combination of an engine shaft, a gear turning therewith, a member rotative on an axis in alinement with that of said shaft, a radially disposed spindle carried by said member, two gears fast on said spindle, one thereof meshing with the first-named gear, a gear meshing with the second of said two gears, a driven shaft having a said last single gear, and in alinement with the engine shaft, a disconnectible variable resistance element connected with the last-mentioned gear, means for clutching the driven shaft into either the last-named gear or said member, means for automatically holding the last-named gear from turning in one direction but not in the other, and means operative when the driven shaft is put into clutch with the last-named gear to simultaneously hold said member from rotation and to disconnect the said automatic holding means from the last-named gear.

6. In a speed change gear, the combination of an engine shaft and a propeller shaft, a rotatably held gear having disconnectible resistance connection between itself and the propeller shaft, a member rotative on an axis in alinement with the engine shaft, a radially disposed spindle carried by said member, two gears fast on said spindle, one thereof meshing with said rotatably held gear, a gear meshing with the other of said two gears and adapted to be rotated by the engine shaft, means for holding said member stationary at will, means for varying the resistance between said rotatably held gear and the propeller shaft, and means for automatically holding from turning said rotatably held gear in one direction, but permitting it in the other direction.

7. In a speed change gear, the combination with an engine shaft and a propeller shaft, of a section of shafting in alinement with and between said two shafts, a bevel gear rotated by the engine shaft, a member fast upon said section of shafting, a radially disposed spindle carried by said member, two bevel gears fast upon said spindle, one being in mesh with the first-named gear, a freely rotatable gear meshing with the other of said two gears, a disconnectible variable resistance between said freely rotatable gear and said section of shafting, means for clutching the same with the propeller shaft alternately, means for automatically holding the freely rotatable gear from motion in one direction but not in the other, means operative at will for locking said member from rotation, means controllable at will for simultaneously locking said member and shifting said clutching means to cause the propeller shaft and said freely rotatable gear to turn together and also to reverse operation, and means controllable at will to vary said resistance.

In testimony that I claim the foregoing invention, I have hereunto set my hand this 29th day of October, 1925.

ALBERT BURDETT CLARK.